United States Patent
Hicks

(10) Patent No.: US 6,874,559 B1
(45) Date of Patent: Apr. 5, 2005

(54) ENCLOSED ROLL AWNING

(75) Inventor: Michael Hicks, El Paso, TX (US)

(73) Assignee: Dometic Corporation, Elkhart, IN (US)

( * ) Notice: Subject to any disclaimer, the term of this patent is extended or adjusted under 35 U.S.C. 154(b) by 0 days.

(21) Appl. No.: 10/680,519

(22) Filed: Oct. 7, 2003

(51) Int. Cl.[7] ............................................. E04F 10/06
(52) U.S. Cl. ......................................... 160/22; 160/29
(58) Field of Search ........................... 160/22, 41, 23.1, 160/29, 313

(56) References Cited

U.S. PATENT DOCUMENTS

| | | | |
|---|---|---|---|
| 1,202,559 A | * 10/1916 | Mercer | 160/31 |
| 1,448,016 A | * 3/1923 | Welshausen | 160/23.1 |
| 2,204,739 A | * 6/1940 | Wells | 160/23.1 |
| 2,354,832 A | * 8/1944 | Ristine | 160/11 |
| 2,589,609 A | * 3/1952 | Foster | 160/23.1 |
| 3,163,204 A | 12/1964 | Golde | |
| 3,364,973 A | 1/1968 | Railson | |
| 3,584,910 A | * 6/1971 | Lupul | 296/97.6 |
| 3,719,220 A | * 3/1973 | Small | 160/108 |
| 3,991,805 A | 11/1976 | Clauss | |
| 5,044,416 A | 9/1991 | Murray | |
| 5,505,244 A | * 4/1996 | Thumann | 160/23.1 |
| 5,542,733 A | 8/1996 | Kintz | |
| 5,622,214 A | 4/1997 | Baka et al. | |
| 5,775,765 A | * 7/1998 | Kintz | 296/98 |
| 5,839,491 A | 11/1998 | Kröner et al. | |
| 6,131,990 A | 10/2000 | Crean | |
| 6,260,909 B1 | 7/2001 | Crean et al. | |
| 6,269,824 B1 | 8/2001 | Brutsaert | |
| 6,279,641 B1 | 8/2001 | Malott | |
| RE37,567 E | 3/2002 | Murray | |

\* cited by examiner

*Primary Examiner*—David Purol
(74) *Attorney, Agent, or Firm*—Pearne & Gordon LLP

(57) ABSTRACT

A roll awning having a cover member journalled within an enclosure. An aperture is provided in the enclosure and an awning fabric extends from the cover member through the aperture. The aperture is movable so that it follows the portion of the awning fabric extending through the aperture.

20 Claims, 3 Drawing Sheets

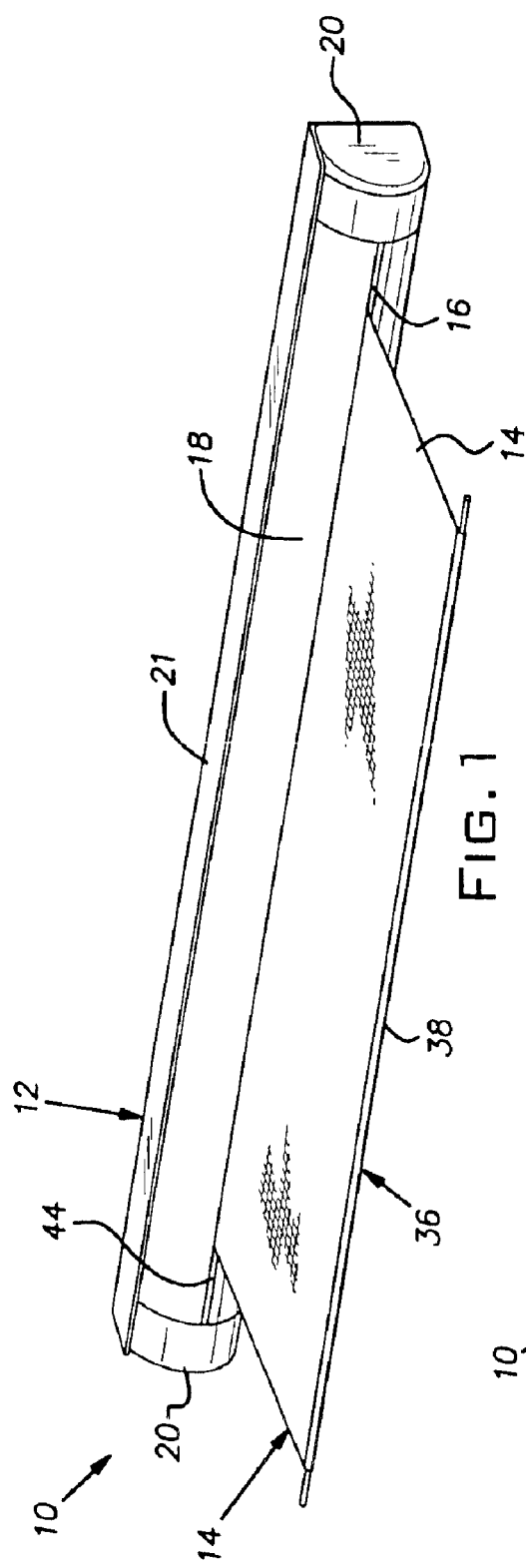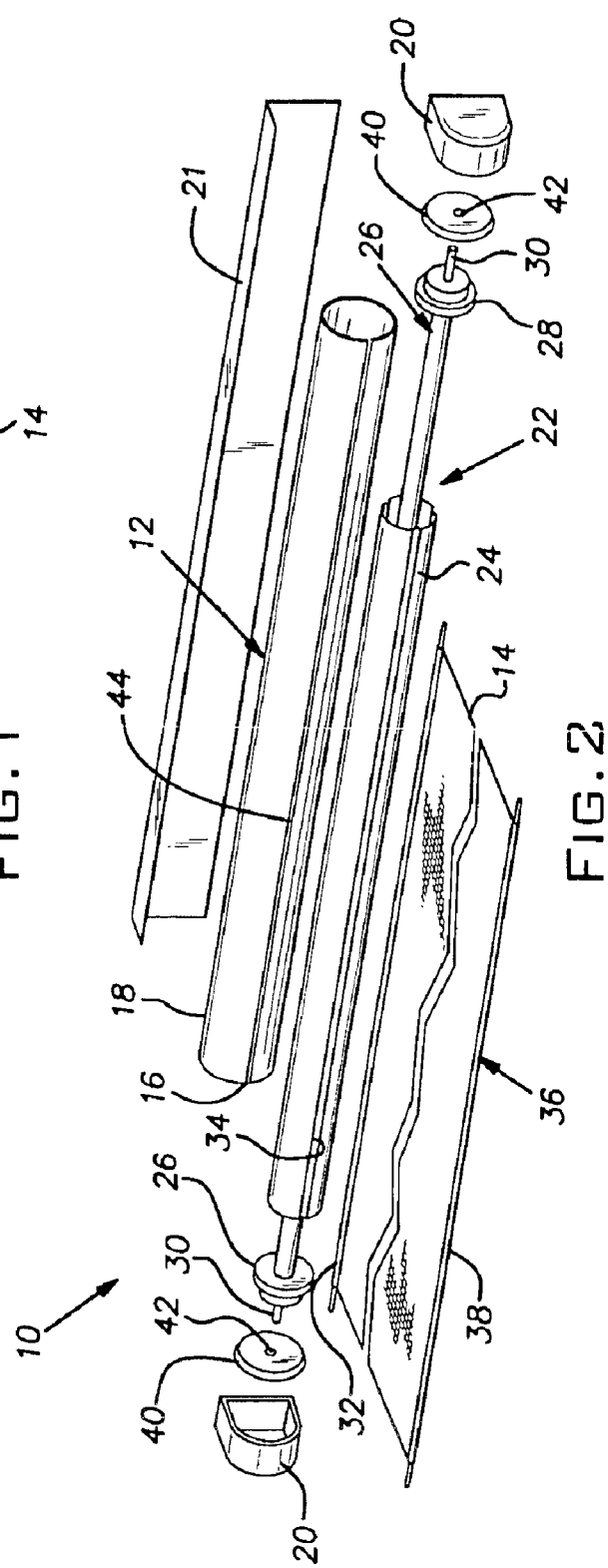

ENCLOSED ROLL AWNING

BACKGROUND OF THE INVENTION

The present invention relates to an awning, and more specifically, to a enclosed retractable roll-style fabric awning assembly.

Roll-style fabric awnings, so-called "roll awnings," are commonly provided on recreational vehicles. Such awnings generally consist of a rotating spindle having a sheet of awning fabric attached and wound onto the spindle. The spindle is mounted along the top edge of an outside wall of a recreational vehicle. The awning is kept fully rolled up on the spindle while the vehicle is configured for traveling. The awning can then be extended by unrolling the fabric from the spindle and supporting its free end with a suitable support pole, bracket or other mechanism. One or more torsion assemblies are often provided in order to assist in the retraction of the awning, as well as to keep it taut while extended.

Modern recreational vehicles are often equipped with slide-out rooms to allow for extra interior space when the vehicle is parked. Since the slide-out rooms normally have flat roofs, rainwater and debris can easily accumulate on their surfaces. In order to prevent this accumulation, a slide-out room may be provided with a roll awning, acting as a so-called "slide topper," that extends over the top of the roof sloping downward when the slide-out room is extended from the vehicle. An example of a slide topper is shown and described in U.S. Pat. No. 6,269,824.

A problem associated with roll awnings is that, despite the usual downward slope, the roll awnings tend to accumulate rainwater and debris. Thus, when the awning fabric is wound back onto the spindle, some of the rainwater and/or debris may be inadvertently wound into the roll. In order to prevent this, wipers or scrapers can be provided that clean the awning fabric as it is wound onto the spindle.

BRIEF SUMMARY OF THE INVENTION

The present invention provides a roll awning comprising: an enclosure; a cover member journalled within the enclosure; an aperture in the enclosure; and an awning fabric comprising a distal portion extending from the cover member through the aperture, the aperture being movable for following the distal portion of the awning fabric.

BRIEF DESCRIPTION OF THE SEVERAL VIEWS OF THE DRAWING

FIG. 1 is a perspective view of an enclosed roll awning assembly according to one embodiment of the present invention;

FIG. 2 is an exploded view thereof;

DETAILED DESCRIPTION OF THE INVENTION

Figure 3:
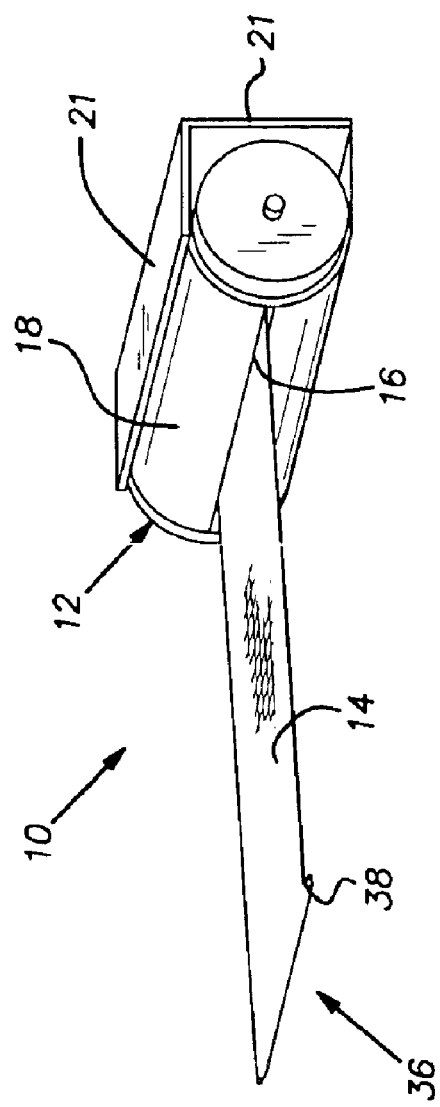
FIG. 3 is perspective view of the roll awning of FIG. 1 showing a movable enclosure tube thereof in a first position.

FIGS. 1 and 2 show an enclosed roll awning assembly 10 according to the present embodiment of the present invention. The awning assembly 10 comprises an enclosure 12 and an awning fabric 14 extending outward through an elongated slit or aperture 16 in a sidewall of a hollow tube or cover member 18 of the enclosure 12. The awning fabric 14 can be constructed of any suitable flexible sheet-like material including plastics, textiles, composite fabrics and the like.

As best shown in FIG. 2, the enclosure 12 surrounds a roll assembly 22. The roll assembly comprises a roller tube or spindle 24, a retraction assembly 26 and a post 30. The roller tube or spindle 24 is connected to the retraction assembly 26. The retraction assembly 26 comprises a pair of torsion springs 28 (shown schematically) resiliently connecting the post 30 located at the end of the retraction assembly 26 to the spindle 24. Each end of the post 30 is fixedly pinned or otherwise attached to a respective one of the end caps 20. Thus, the spindle 24 is torsionally biased by the retraction assembly 26. The awning fabric 14 is fixedly attached to the spindle 24 by way of a first rod 32 that cooperates with a complementary longitudinal groove 34 in the spindle 24. The awning fabric 14 is wound onto the spindle 24 in an equilibrium state of the torsion spring 28. As a distal or free end 36 of the awning fabric 14 is pulled away from the roll assembly 22 by an operator, the torsional force of the torsion spring 28 acts as an opposing force, keeping the awning fabric 14 taut and biased to a retracted or fully wound position. When the operator releases the awning fabric 14, it is automatically wound back onto the spindle 24. Alternatively, other means of retracting the awning fabric 14 could be used in place of the retraction assembly 26, such as a hand operated crank or a motor.

A second rod 38 is provided at the free end 36 of the awning fabric 14. The second rod 38 has a diameter larger than the lateral width of the aperture 16, thus preventing the free end 36 of the awning fabric 14 from being retracted into the enclosure 12. The second rod 38 can be secured to a supporting structure such as one or more supporting poles (not shown). The second rod 38 may also be secured to a slide out room of a recreational vehicle, such that the awning is extended over the roof of the room as it is slide out of the vehicle.

Figure 4:
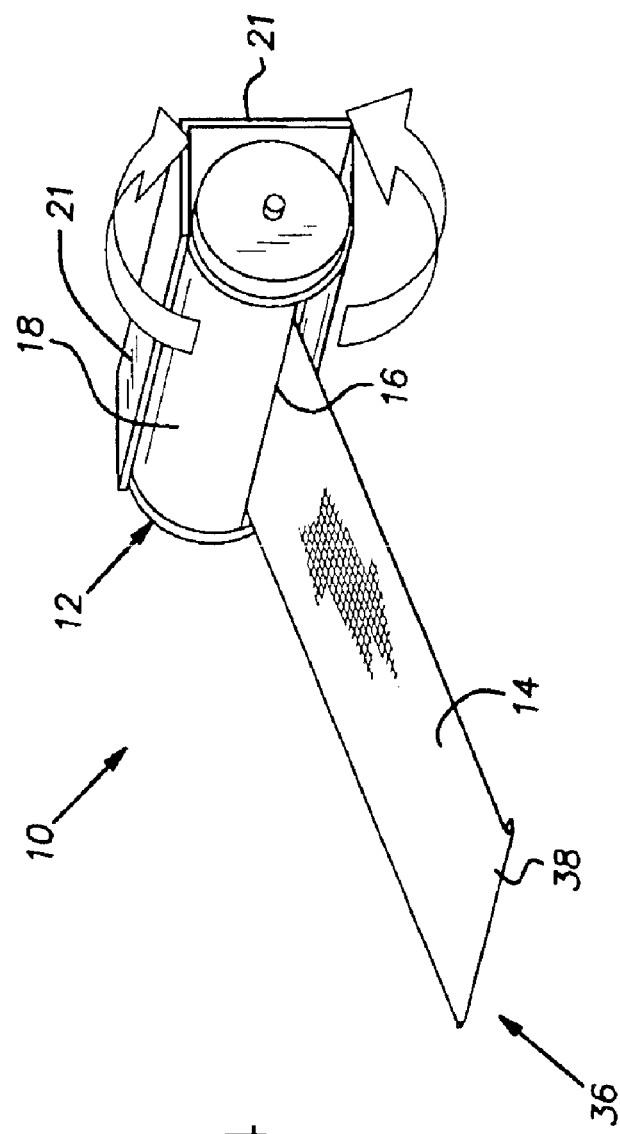
FIG. 4 is perspective view of the roll awning of FIG. 1 showing a movable enclosure tube thereof in a second position.

The tube portion 18 of the enclosure 12 is journalled or rotatably coupled to the roll assembly 22 by a pair of pivot covers 40. The pivot covers 40 are generally disc-shaped members, each being carried on one of the posts 30 inserted through a central hole 42 in the pivot cover 40, such that the pivot covers 40 may freely pivot or rotate about the posts 30. The pivot covers 40 are fixedly attached to the cover 18 at each of its ends, supporting the cover 18 while allowing it to rotate freely about the roll assembly 22. As shown in FIGS. 3 and 4, when the free end 36 of the awning fabric 14 is at least partially extend extended through the aperture 16 away from the roll assembly 22, vertical displacement of the free end 36 causes the tube portion 18 of the enclosure 12 to rotate correspondingly. Thus, the aperture 16 follows the free end 36 of the awning fabric as it is moved up or down. The aperture 16 is thereby automatically aligned with the pitch of the free end 36 of the awning fabric 14, which is generally tangential to the rolled portion of the fabric 14. As the awning fabric 14 retracts into the enclosure 12, a top edge 44 of the aperture 16, acting as a sweep member, pushes or sweeps away any debris and/or liquid which may have accumulated on the awning fabric 14. Since the aperture 16 need only be large enough to accommodate the awning fabric 14, the interior of the enclosed roll awning assembly 10 is kept relatively free of debris and other contaminants.

Figure 5:
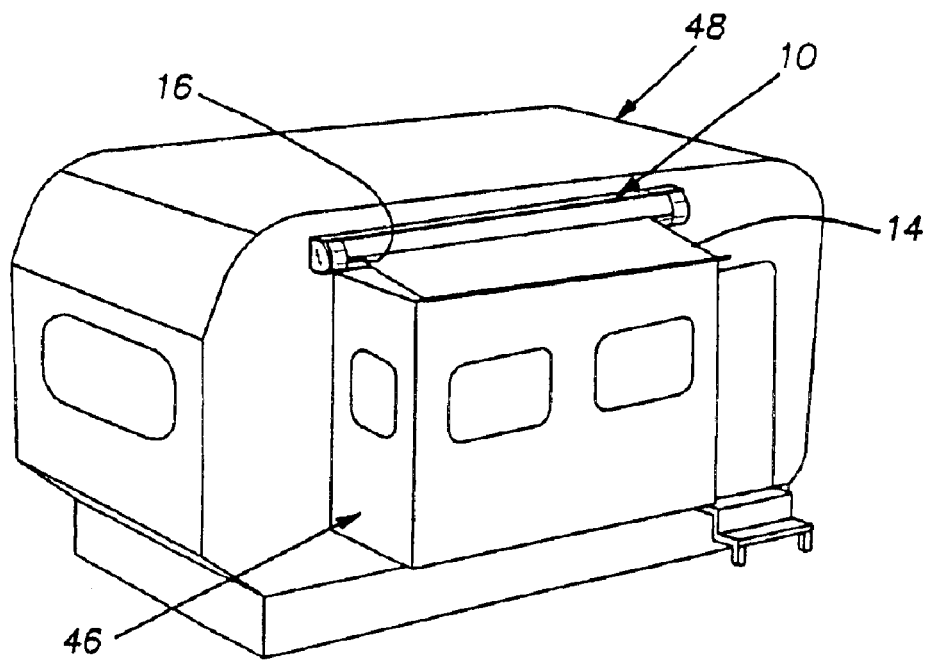
FIG. 5 is a perspective view of the roll awning of FIG. 1 shown as a slide topper for a slide-out room of a recreational vehicle.

As shown in FIG. 5, the enclosed roll awning assembly 10 can be used to provide a slide topper for a slide-out room 46 of a recreational vehicle 48. The awning fabric 14 extends over the roof of the slide-out room 46. The free end 46 of the awning fabric 14 is attached to the top outside edge of the slide-out room 46 so that as the room 46 is extended or slid out, the awning fabric 14 is automatically extended while the aperture 16 follows the pull of the fabric 14. Likewise, as the room 46 is retracted, the awning fabric 14 is automatically wound onto the spindle 24 while the aperture 16 follows the pull of the fabric 14.

Figure 6:
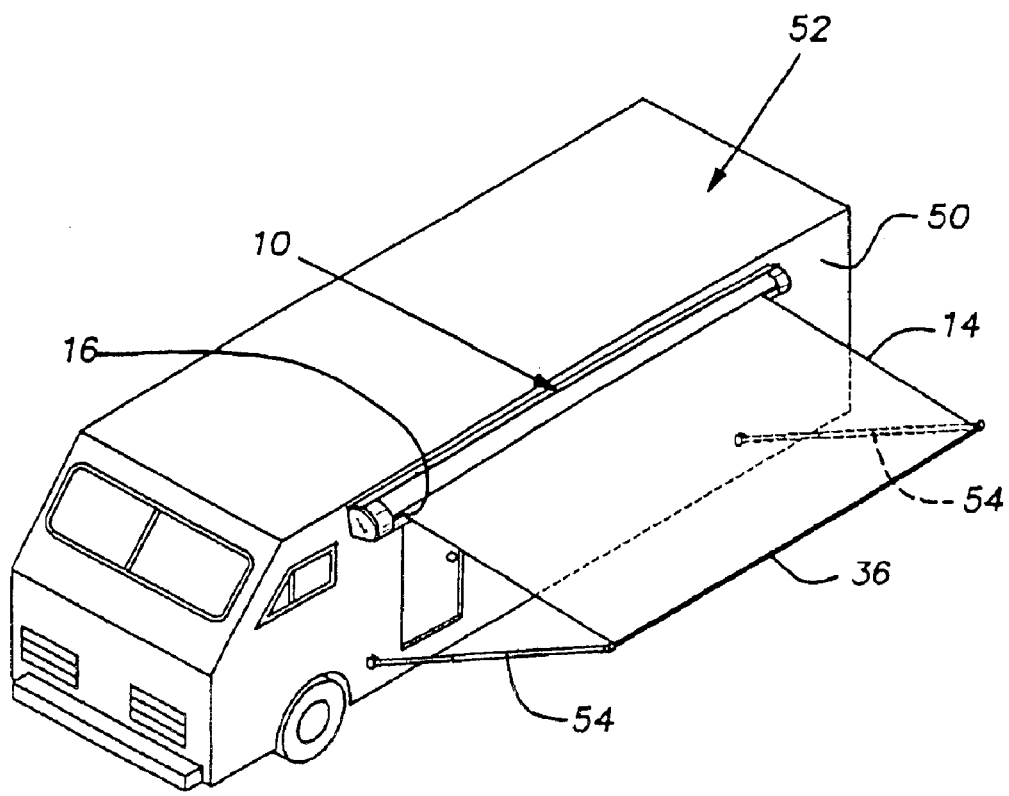
FIG. 6 is a perspective view of the roll awning of FIG. 1 shown attached to a recreational vehicle and supported by a pair of arms.

As shown in FIG. 6, the enclosed roll awning assembly 10 can be also used to provide an awning on a wall 50 of a recreational vehicle 52. A pair of arms 54 pivotally attached to the wall 50 of the vehicle 52 support the awning fabric 14 at its free end 36. As the arms 54 are extended or pivoted outwardly, the awning fabric 14 is automatically extended while the aperture 16 follows the fabric 14. Likewise, as the arms 54 are retracted or pivoted inwardly, the awning fabric 14 is automatically wound onto the spindle 24 while the aperture 16 follows the pull of the fabric 14.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A roll awning comprising:
   an enclosure comprising a cover member including an aperture, a first end and a second end, the enclosure further comprising a first end cap-covering the first end of the cover member, a second end cap covering the second end of the cover member, a first pivot cover fixedly attached to the first end of the cover member and a second pivot cover fixedly attached to the second end of the cover member; and
   an awning fabric comprising a distal portion extending from the cover member through the aperture, wherein the cover member is rotatable with respect to the first and second end caps such that the aperture being is movable for following the distal portion of the awning fabric.

2. The roll awning of claim 1 further comprising a roll assembly connected to the awnings fabric, wherein the first and second pivot rovers are rotatable connected to the roll assembly such that the cover member may freely rotate with respect to the roll assembly.

3. The roll awning of claim 2, wherein the roll assembly is fixedly connected to the first and second end caps.

4. The roll awning of claim 2 wherein the roll assembly comprises a post, wherein the first and second pivot covers are rotatably connected to the post.

5. The roll awning of claim 4 wherein the first and second pivot covers each include a central hole, wherein the post extends through the central hole of each of the first and second pivot covers.

6. The roll awning of claim 4 wherein the roll assembly further comprises a spindle connected to the awning fabric and rotatable with respect to the post.

7. The roll awning of claim 6 wherein the roll assembly further comprises a retraction assembly connected between the post and the spindle.

8. The roll awning of claim 7 wherein the retraction assembly comprises a torsion spring.

9. A roll awning comprising:
   a cover member including an aperture, a first end and a second end,
   a first and second mounting device;
   a first pivot member fixedly attached to the first end of the cover member and a second pivot member fixedly attached to the second end of the cover member;
   a roll assembly fixedly connected to the first and second mounting devices; and
   an awning fabric connected to the roll assembly and comprising a distal portion extending from the cover member through the aperture, and the first and second pivot members are rotatably connected to the roll assembly such that the cover member may freely rotate with respect to the roll assembly, wherein the aperture may follow the distal portion of the awning fabric.

10. The roll awning of claim 9 wherein the cover member comprises a hollow tube comprising a side wall, the aperture being formed in the side wall.

11. The roll awning of claim 9 further comprising a mounting structure for attaching the first and second mounting devices to a supporting structure.

12. The roll awning of claim 9 further comprising a sweep member located adjacent the aperture for removing liquid and/or debris from the awning fabric.

13. The roll awning of claim 9 wherein the first and second pivot members are each disc-shaped cover members.

14. The roll awning of claim 9 wherein the first mounting device comprises a first end cap that covers the first end of the cover member and the second mounting device comprises a second end cap covers the second end of the cover member.

15. The roll awning of claim 9 wherein the roll assembly comprises a post including a first end fixedly connected to the first mounting device and a second end fixedly connected to the second mounting device, wherein the first and second pivot members are rotatably connected to the post.

16. The roll awning of claim 15 wherein the first and second pivot members each include a central bole, wherein the post extends through the central hole of each of the first and second pivot members.

17. The roll awning of claim 15 wherein the roll assembly further comprises a spindle connected to the awning fabric and rotatable with respect to the post.

18. The roll awning of claim 17 wherein the roll assembly further comprises a retraction assembly connected between the post and the spindle.

19. The roll awning of claim 18 wherein the retraction assembly comprises a torsion spring.

20. A roll awning comprising:
   an enclosure comprising a cover member including a side wall, a first end, a second end, and an elongated aperture formed in the side wall and extending in a longitudinal direction of the cover member, the enclosure further comprising a first end cap covering the first end of the cover member, a second end cap covering the second end of the cover member, a first pivot cover fixedly attached to the first end of the cover member and a second pivot cover fixedly attached to the second end of the cover member;
   a roll assembly comprising a post including a first end fixedly connected to the first end cap and a second end fixedly connected to the second end cap, wherein the first and second pivot covers are rotatably connected to the post, the roll assembly further comprising a spindle rotatable with respect to the post and positioned such that the cover member surrounds the spindle, and a retraction assembly connected between the post and the spindle; and
   an awning fabric connected to the spindle and comprising a distal portion extending from the cover member through the elongated aperture, wherein the cover member may freely rotate with respect to the roll assembly such that the aperture may follow the distal portion of the awning fabric.

* * * * *